United States Patent

Nobumoto

[11] Patent Number: 5,823,052
[45] Date of Patent: Oct. 20, 1998

[54] AUTOMATIC TRANSMISSION CONTROL SYSTEM

[75] Inventor: Hidetoshi Nobumoto, Hiroshima, Japan

[73] Assignee: Mazda Motor Corporat ion, Hiroshima, Japan

[21] Appl. No.: 834,820

[22] Filed: Mar. 31, 1997

[30] Foreign Application Priority Data

Mar. 29, 1996 [JP] Japan .................................. 8-077468
Jan. 21, 1997 [JP] Japan .................................. 9-008592

[51] Int. Cl.⁶ .................................................. F16H 61/00
[52] U.S. Cl. .................................................. 74/335
[58] Field of Search .............................. 74/335; 701/52

[56] References Cited

U.S. PATENT DOCUMENTS 4,425,620 1/1984 Batcheller et al. ....................... 701/52
4,905,530 3/1990 Stehle et al. ............................. 74/335
5,127,288 7/1992 Hojo et al. ............................... 74/335

FOREIGN PATENT DOCUMENTS 59-37359 2/1984 Japan .

Primary Examiner—Dirk Wright
Attorney, Agent, or Firm—Sixbey, Friedman, Leedom & Ferguson, P.C.; Gerald J. Ferguson, Jr.

[57] ABSTRACT

A toriydal type of automatic transmission is changeable between an automatic shift mode and a manual shift mode in which a shift up switch or a shift down switch is operated. The automatic transmission in the manual shift mode is shifted down by one step when the shift down switch is operated and shifted up by two step when the shift up switch is operated, so that the transmission gear ratio changes at a rate smaller during a manual down shift than during a manual up shift.

9 Claims, 16 Drawing Sheets

AUTOMATIC TRANSMISSION CONTROL SYSTEM

BACKGROUND OF THE INVENTION

1. Field of the Invention

The present invention relates to a control system for a continuously variable automatic transmission, such as a toroidal type continuously variable automatic transmission and a pulley type continuously variable automatic transmission, and a gear type multiple gear automatic transmission.

2. Description of Related Art

Typically, this kind of automatic transmissions are automatically changed in gear ratio in accordance with driving conditions including, for example, engine load and engine speed. However, because the gear ratio is unconditionally determined in accordance with driving conditions, in some driving conditions, even there is a driver's demand for another gear ratio, it is hard to meet the driver's demand. Some types of automatic transmissions, such as proposed in, for example, Japanese Unexamined Patent Publication No.59-37539, are altered in shift mode between an automatic shift mode and a manual shift mode which permits the driver to manually change the gear ratio.

When shifting such an automatic transmission in the manual shift mode, in some down shifts in which the gear ratio is made larger, it potentially occurs to control the speed of vehicle without taking an acceleration pedal operation or a brake pedal operation but with an effect of engine brake only on, for example, a downward slope. In order to allow fine adjustment of the effect of engine brake, while it is preferred to set a low change rate of gear ratio so as to meet demands of down shifts, however, the gear ratio change rate is too low for the driver to experience a perceptible change of speed through a bodily sensation and possibly entraps him or her into trying to change gears at frequent intervals.

SUMMARY OF THE INVENTION

It is an object of the present invention to provide an automatic transmission control system for an automatic transmission changeable between an automatic shift mode and a manual shift mode, which changes the gear ratio continuously or stepwise to provide desired gears and controls a change of gear ratio to meet demands of both up shifts and down shifts in the manual shift mode and thereby gives the driver an improved feeling of gear shift even in the manual shift mode.

The foregoing object of the invention is accomplished by providing an automatic transmission control system changeable between an automatic shift mode and a manual shift mode, which controls the change in gear ratio to shift the automatic transmission to desired gears, and makes the rate or speed of change in gear ratio between down shifts and up shifts. The automatic transmission control system makes the change rate of gear ratio to shift the automatic transmission to a desired gear through operation of manual shift means in the manual shift mode and a shift speed control means which controls the gear ratio control means which, on one hand, makes the change rate of gear ratio of the automatic transmission lower when a shift down means is continuously operated than when the shift up means is operated and, on the other hand, makes the change rate of gear ratio lower when the shift up means is continuously operated than when the shift down means is operated. As a result, the change rate of gear ratio becomes relatively lower during a down shift as compared with during an up shift, the operation of shift down means can make the gear ratio higher by a little, enabling fine adjustment of the effect of engine brake. On the other hand, the change rate of gear ratio becomes relatively higher during an up shift as compared with during a down shift, the operation of shift up means can make the gear ratio greatly higher, making the driver experience a perceptible decrease in gear ratio through a bodily sensation during an up shift.

The automatic transmission control system may detect a duration of continuous operation of the shift means, and makes the change rate higher when the duration of continuous operation is longer than a specified time than when it is shorter than the specified time. Alternatively, the automatic transmission control system may change the change rate so as to change the gear ratio to a gear ratio for a highest available gear at once when the duration of continuous operation of the shift up means is longer than the specified time. These make it possible to quickly drop the input speed of rotation to the automatic transmission.

The automatic transmission control system may comprise a gear shift control means (115) which makes the change rate higher when a gear prior to changing the change rate of gear ratio is higher than when the gear is lower. This yields a large resistance against, for example, the automatic transmission at its input end, providing an improved feeling of gear shift.

Further, when both shift up means and shift down means are coincidentally operated, the change rate varying means keeps the change rate of gear ratio with an effect of preventing an unnecessary gear shift caused due to wrong operation of the manual shift means from occurring.

When an actuator is used to control a change of the gear ratio in accordance with magnitude of an electric signal, the automatic transmission control system may controls the electric signal magnitude so as to change the gear ratio at a change speed lower when the shift down means is operated than when the shift up means is operated. In this instance, the automatic transmission control system, on one hand, makes the electric signal magnitude greater as the duration of continuous operation becomes longer and, on the other hand, makes it smaller as the duration of continuous operation becomes shorter.

According to this embodiment, because the change speed of gear ratio becomes relatively lower during a down shift, the gear ratio gradually increased in response to repeated operations of the shift down means switch, achieving fine adjustment of the effect of engine brake and preventing the vehicle from encountering unstable driving resulting from an increase in slippage of the drive wheels due to a sharp increase in gear ratio. On the other hand, because the change speed of gear ratio becomes relatively higher during an up shift, making the driver experience a perceptible decrease in gear ratio through a bodily sensation during an up shift.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote same or similar parts or elements throughout the drawings, and in which.

DETAILED DESCRIPTION OF THE PREFERRED EMBODIMENTS

Figure 1:
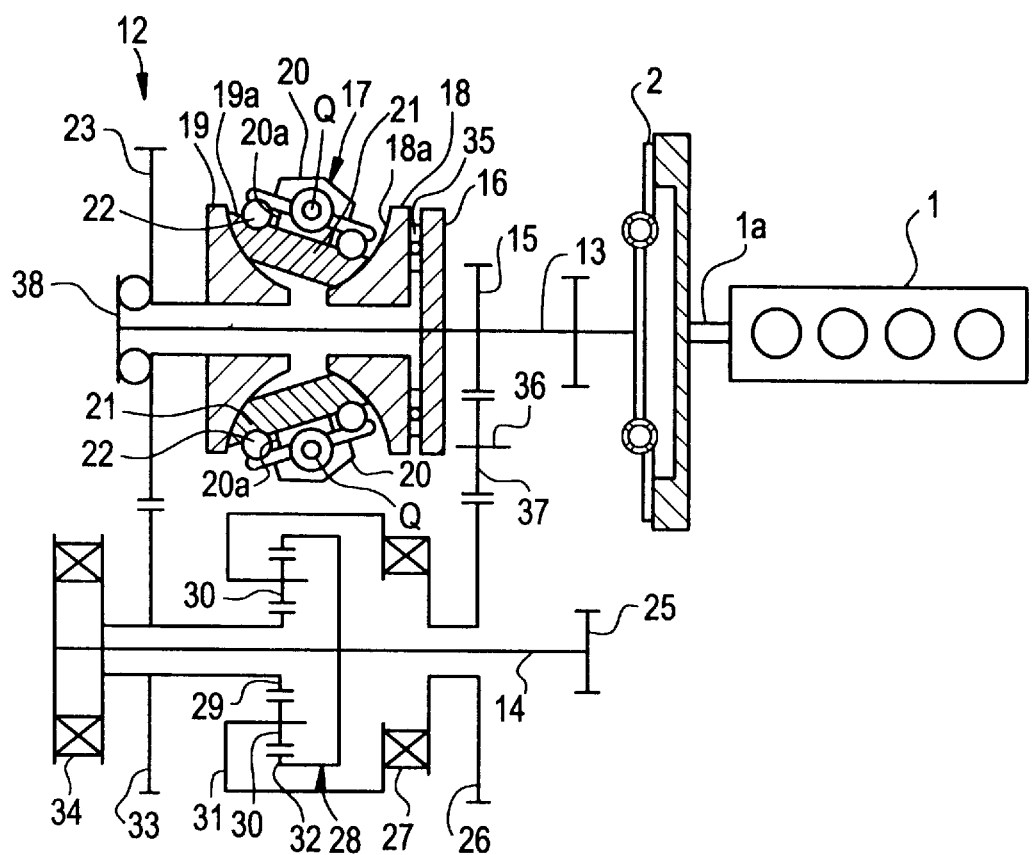
FIG. 1 is a skeleton diagram showing a toroidal type continuously variable automatic transmission equipped with a transmission control system in accordance with a specific embodiment of the invention.

Referring to the drawings in detail, in particular, to FIG. 1, a toroidal type of continuously variable automatic transmission (which is hereafter referred to as an automatic transmission for simplicity) 12 controlled by a control system of the invention is connected to an output shaft 1a of an engine 1 through an engine clutch 2. The automatic transmission 12 has a transmission input shaft 13 coaxial with the engine output shaft 1a, a transmission output shaft 14 in parallel with the transmission input shaft 13, and an intermediate shaft 36 in parallel with both transmission input and output shafts 13 and 14. The output shaft 14 is connected to drive wheels (not shown) through a transmission output gear 25. The transmission input shaft 13 mounts thereon, in order from the engine 1, a first drive gear 15 and a holding disk 16, a toroidal transmission gear unit 17, and a second drive gear 23. These first drive gear 15 and holding disk 16 are fixed with respect to the transmission input shaft 13, and the second drive gear 23 is supported for rotation with respective to the transmission input shaft 13, and hence the first drive gear 15 and holding disk 16. The transmission output shaft 14 mounts thereon, in order from the engine 1, the output gear 25, a first driven gear 26, a low-clutch 27, a planetary gear set 28, a second driven gear 33, and a high-clutch 34. The transmission output gear 25 is fixed with respect to the transmission output shaft 14, and the first and second driven gears 26 and 33 are supported for rotation with respect to the transmission output shaft 14, and hence the transmission output gear 25. The transmission input shaft is provided with an end disk 38 fastened to its end to prevent the output disk 19 forced by the power rollers 21 from slipping off from the input disk 18.

The toroidal transmission unit 17 has an input disk 18 mounted for rotation on the transmission output shaft 13 on the side close to the engine 1, an output disk 19 mounted for rotation on the transmission output shaft 13 on the opposite side remote from the engine 1 with respect to the input disk 18, and a pair of power rollers 21. The input disk 18 at its back surface on the side of the engine 1 is forced against the holding disk 16 through a loading cam 35. The output disk 19 is operationally integrated with the second drive gear 23. Each power roller 21 is supported for rotation by a pivot arm 20a fastened to a support member 20 which is able to swing about a center axis Q located in a twisted position with respect to the transmission input shaft 13 and extending toward the transmission input shaft 13 (which is a center axis of rotation of the input and output disks 18 and 19). A thrust bearing 22 is held between the support 20 and the power roller 21. The power roller 21 has a peripheral surface in conformity with the toroidal surface of the input and output disks 18 and 19 and is held in frictional contact with and supported for rotation by the opposing toroidal surfaces 18a and 19a of the input and output disks 18 and 19 to transmit torque between the input and output disks 18 and 19. The power roller 21 is tilted with respect to the input and output disks 18 and 19 by means of swinging action of the support 20 about the center axis Q and rotated. According to the tilt angles of the power roller 21 with respect to the toroidal surfaces 18a and 19a of the input and output disks 18 and 19, the transmitted torque ratio between the input and output disks 18 and 19, namely the gear ratio, is changed. Specifically, the gear ratio of the toroidal transmission unit 17 is determined on the basis of ratio between a radial distance of the contact point between the power roller 21 and the input disk 18 from the transmission input shaft 13 and a radial distance of the contact point between the power roller 21 and the output disk 19 from the transmission input shaft 13.

The planetary gear set 28 is comprised of a sun gear 29 mounted for rotation on the transmission output shaft 14, a plurality of pinions 30 in external mesh with the sun gear 29, a pinion carrier 31 bearing the pinions 30 for rotation, and an external ring gear 32 fastened to the transmission output shaft 14 and kept in mesh with the pinions 30. The sun gear 29 is fixedly connected to the second driven gear 33.

The intermediate shaft 36 fixedly mounts an idle gear 37 in mesh with the first drive gear 15 and first driven gear 26 which is driven by the first drive gear 15 and drives the first driven gear 26. The low clutch 27 is disposed between the first driven gear 26 and the pinion carrier 31 of the planetary gear set 28 to connect and disconnect the torque transmission between them. The high clutch 34 is disposed between the transmission output shaft 14 and the second driven gear, and hence the sun gear 29 of the planetary gear set 28, to connect and disconnect the torque transmission between them. Locking and unlocking these clutches 27 and 28 in specified states shifts the automatic transmission 12 into a reverse gear, low forward gears and high forward gears. The gear ratio of the automatic transmission 12 is changed through both toroidal transmission unit 17 and planetary gear set 28 in the reverse gear and low forward gears, and through only the toroidal transmission unit 17 in the high forward gears.

Figure 2:
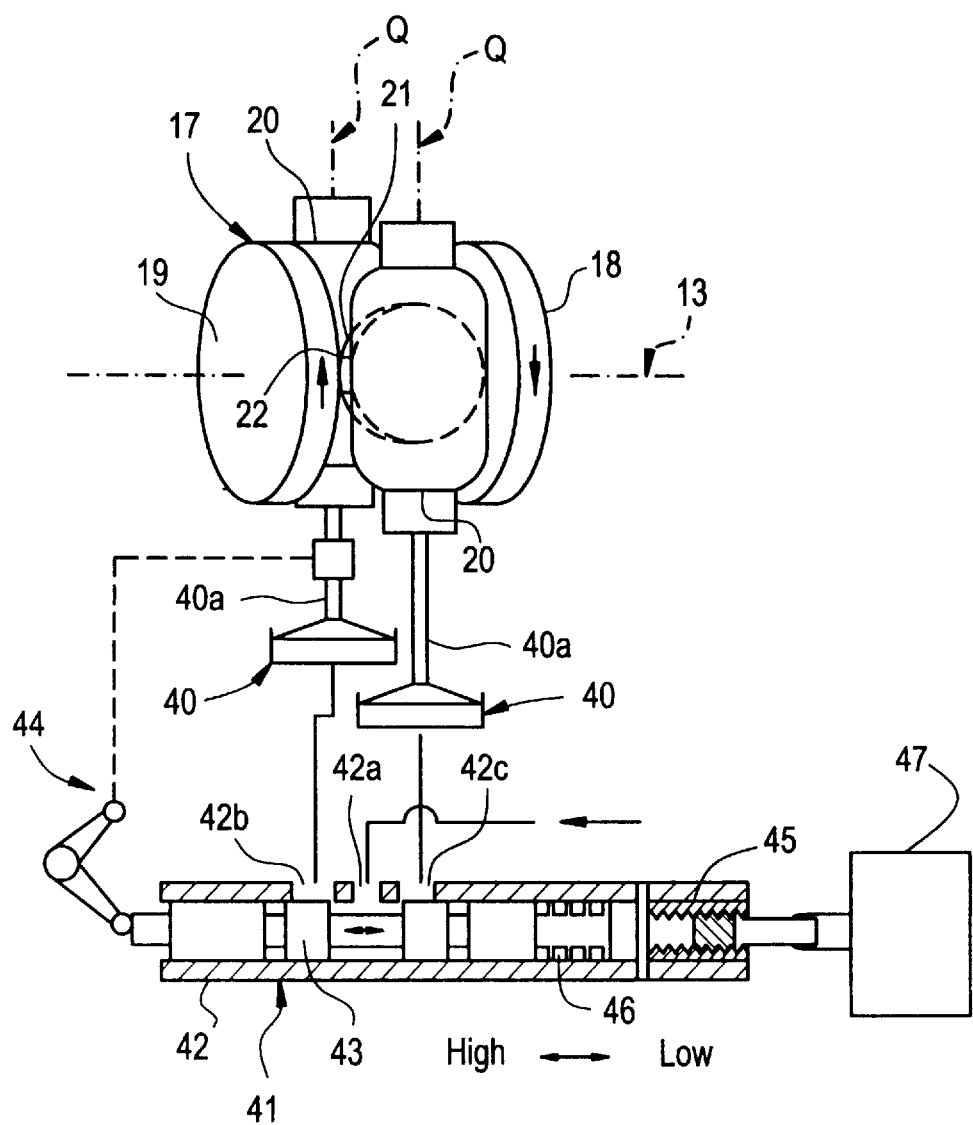
FIG. 2 is a gear shift mechanism of the toroidal type continuously variable automatic transmission of FIG. 1.

FIG. 2 shows the mechanism of gear shift control through the toroidal transmission unit 27 in detail. As shown in FIG.

2, the supports 20 are connected to hydraulic cylinders 40 through piston rods 40$a$, one of which is for the high forward gears and another of which is for the low forward gears, respectively and turned about the center axis of the transmission input shaft 13 in opposite directions by the hydraulic cylinders 40, tilting around the center axes Q, respectively. The hydraulic cylinders 40 are selectively supplied with hydraulic line pressure through a gear ratio control valve 41 such as an electromagnetic switch valve. This control valve 41 comprises a valve body 42 formed in the shape of cylindrical sleeve which is axially movable in a valve casing (not shown) and a spring loaded spool 43 received and capable of sliding in the valve body 42. The valve body 42 is formed with an inlet port 42$a$ and outlet ports 42$b$ and 42$c$ positioned on axially opposite sides of the inlet port 42$a$. Hydraulic line pressure is supplied to the control valve 41 through the inlet port 42$a$ and discharged from the control valve 41 to the hydraulic cylinders 40 through the outlet port 42$b$ or 42$c$. The outlet port 42$b$ is brought into communication with the hydraulic cylinder 40 for the high forward gears. On the other hand, the outlet port 42$c$ is brought into communication with the hydraulic cylinder 40 for the low forward gears. A compression coil spring 46 is disposed between the spool 43 and an abutment sleeve 45 received for slide movement in the valve body 42. This abutment sleeve 45 is linked to a stepping motor 47 and axially moved in the valve body 42 by the stepping motor 47 to force the spool 43 through the coil spring 46. The axial movement of the spool 43 depends on the number of drive pulses given to the stepping motor 47. The spool 43 inversely changes open areas of the outlet ports 42$a$ and 42$c$. That is, the more the outlet port 42$b$ is opened, the more the outlet port 42$c$ is closed. Consequently, the quantities of pressurized fluid to the hydraulic cylinders are inversely changed. For example, when the spool 43 is moved to the right as viewed in FIG. 2 to increase the open area of the outlet port 42$c$ for the low forward gears and decrease the open area of the outlet port 42$b$ for the high forward gears, increasing the quantity of pressurized fluid to the hydraulic cylinder 40 for low forward gears. As a result, the radial distance of contact point between the input disk 18 and the power roller 21 from the center axis of the transmission input shaft 13 becomes shorter than the radial distance of contact point between the output disk 19 and the power roller 21 from the center axis of the transmission input shaft 13, which makes the gear ratio of the toroidal transmission unit 17 higher. On the other hand, when the spool 43 is moved to the left as viewed in FIG. 2 to increase the open area of the outlet port 42$b$ for the high forward gears and decrease the open area of the outlet port 42$c$ for the low forward gears, increasing the quantity of pressurized fluid to the hydraulic cylinder 40 for high forward gears. As a result, the radial distance of contact point between the output disk 19 and the power roller 21 from the center axis of the transmission input shaft 13 becomes shorter than the radial distance of contact point between the input disk 18 and the power roller 21 from the center axis of the transmission input shaft 13, which makes the gear ratio of the toroidal transmission unit 17 lower. The toroidal transmission unit 17 is provided with a mechanical feedback mechanism 44 between the spool 43 of the gear ratio control valve 41 and the piston rod 40$a$ of the hydraulic cylinder 40 for the high forward gears.

Figure 3:
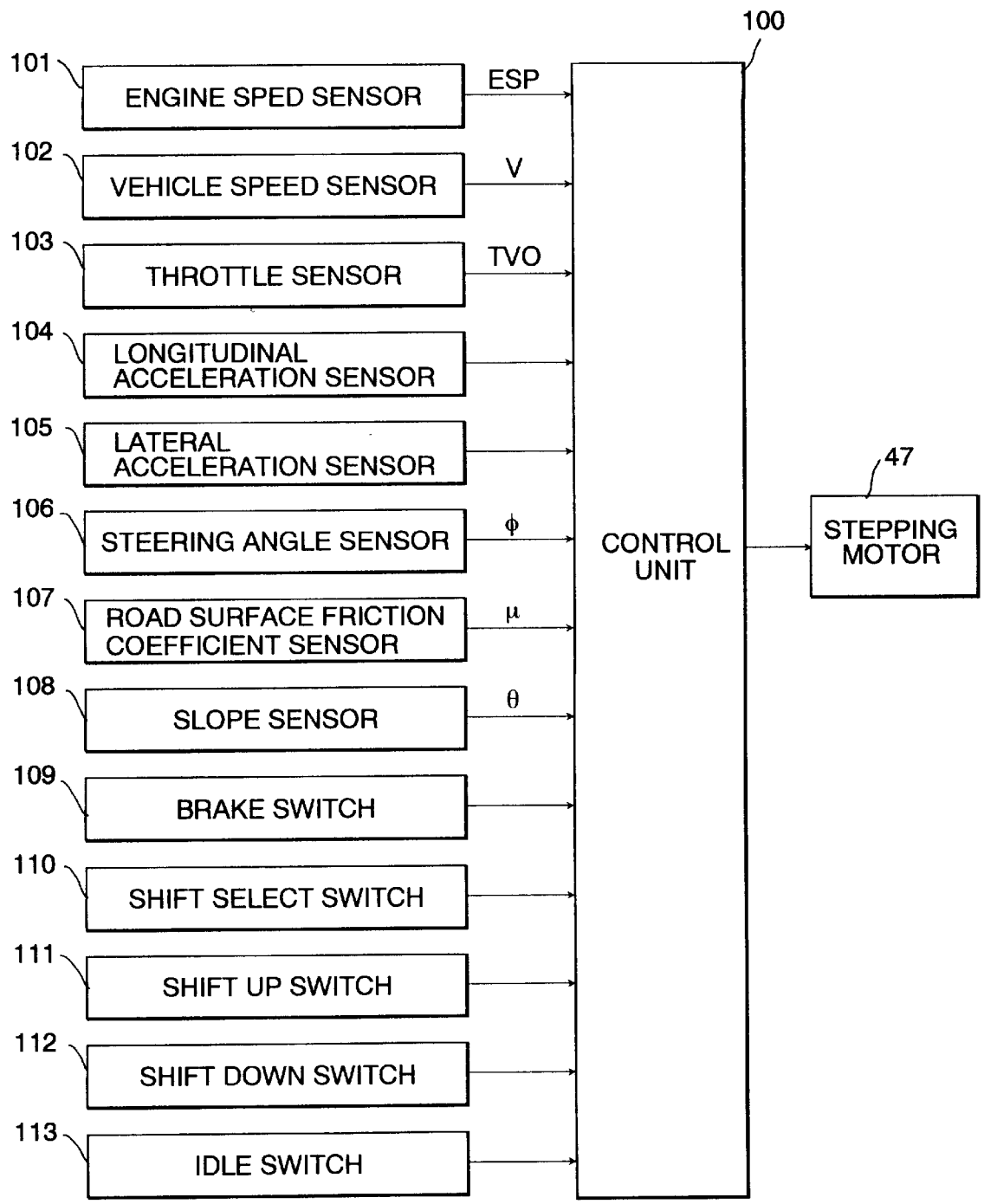
FIG. 3 is a block diagram of the transmission control system for use with the automatic transmission of FIG. 1.

FIG. 3 is a block diagram showing a gear ratio control system which controls the stepping motor 47 to control the gear ratio of the toroidal transmission unit 17. As shown in FIG. 3, the stepping motor 17, as well as other control actuators (not shown) necessary for the automatic transmission control, is controlled with pulse signals from a control unit 100. Specifically, the control unit 100 receives various control signals including an engine speed signal (ESP), a vehicle speed signal (V), an engine throttle position signal (TVO), a longitudinal acceleration signal, a lateral acceleration signal, a steer angle ($\phi$), road surface friction coefficient ($\mu$), a road surface grade ($\theta$), a brake signal, a manual shift mode select signal, a manual shift up command signal, and an on-idle signal. These signals are provided by sensors and switches. In more detail, speed sensors 101 and 102 detect the speeds of rotation of the transmission input shaft 13 and the transmission output shaft 14 substitutive for the engine speed (ESP) and the vehicle speed (V), respectively. A position sensor 103 detects the opening of engine throttle valve. Acceleration sensors 104 and 105 detect the longitudinal acceleration and lateral acceleration, respectively. An angle sensor 106 detects the steer angle ($\phi$) of a steering wheel 50 (see FIG. 4). A friction sensor 28 detects the frictional coefficient ($\mu$) of a road surface. A slope sensor 108 detects the road surface grade ($\theta$). A brake switch 109 is activated to provide the brake signal when a brake pedal (not shown) is stepped on. A manual shift mode select switch 110 is operated to select the manual gear shift mode and generates a manual shift mode select signal. A shift up switch 111 is operated to provide a shift up command signal. Similarly, a shift down switch 112 is operated to provide a shift down command signal. An idle switch 113 is activated when the engine 1 is idling. All of these sensors and switches 101 through 113 are known in various types, and may take any well known type. As will be described in detail later, the control unit 100 drives the stepping motor 47 with drive pulse signals provided based on an automatic gear shift map (see FIG. 6) which specifies target engine speed (ESPO) with respect to vehicle speed (V) and engine throttle opening (TVO) to change the gear ratio of the toroidal transmission unit 17 so as to bring the engine speed (ESP) into agreement with the target engine speed (ESPO).

Figure 4:
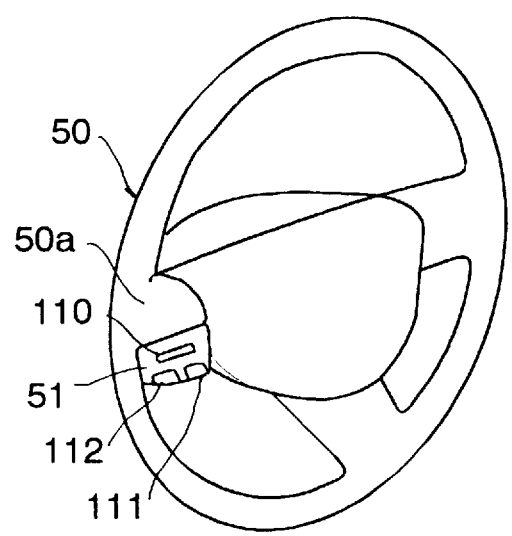
FIG. 4 is a schematic perspective view of a steering wheel.
Figure 5:
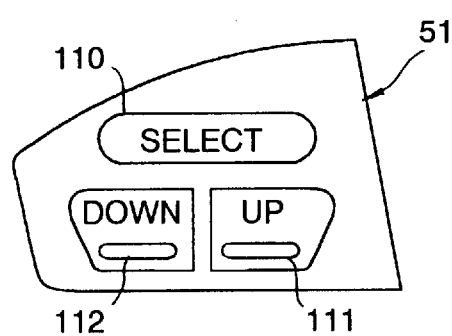
FIG. 5 is an enlarged plan view of a manual shift operation panel of the steering wheel.

FIGS. 4 and 5 show the steering wheel 50 provided with switches 110 through 112 in relation to manual gear shifts. The steering wheel 50 of a right driving vehicle has a switch board 51, secured to a spoke 50$a$ at the right as viewed when the vehicle is traveling straight ahead, on which the manual shift mode select switch 110, the shift up switch 111 and the shift down switch 112 are arranged. Specifically, the manual shift mode select switch 110 is located above the shift up switch 111 and the shift down switch 112 laid side by side. The shift up switch 111 is preferably disposed on an inner side of the shift down switch 112 in the radial direction. The manual shift mode select switch 110, which may be of a push-on push-off type, is pushed to select the manual gear shift mode and pushed again to resume the automatic gear shift mode.

Figure 6:
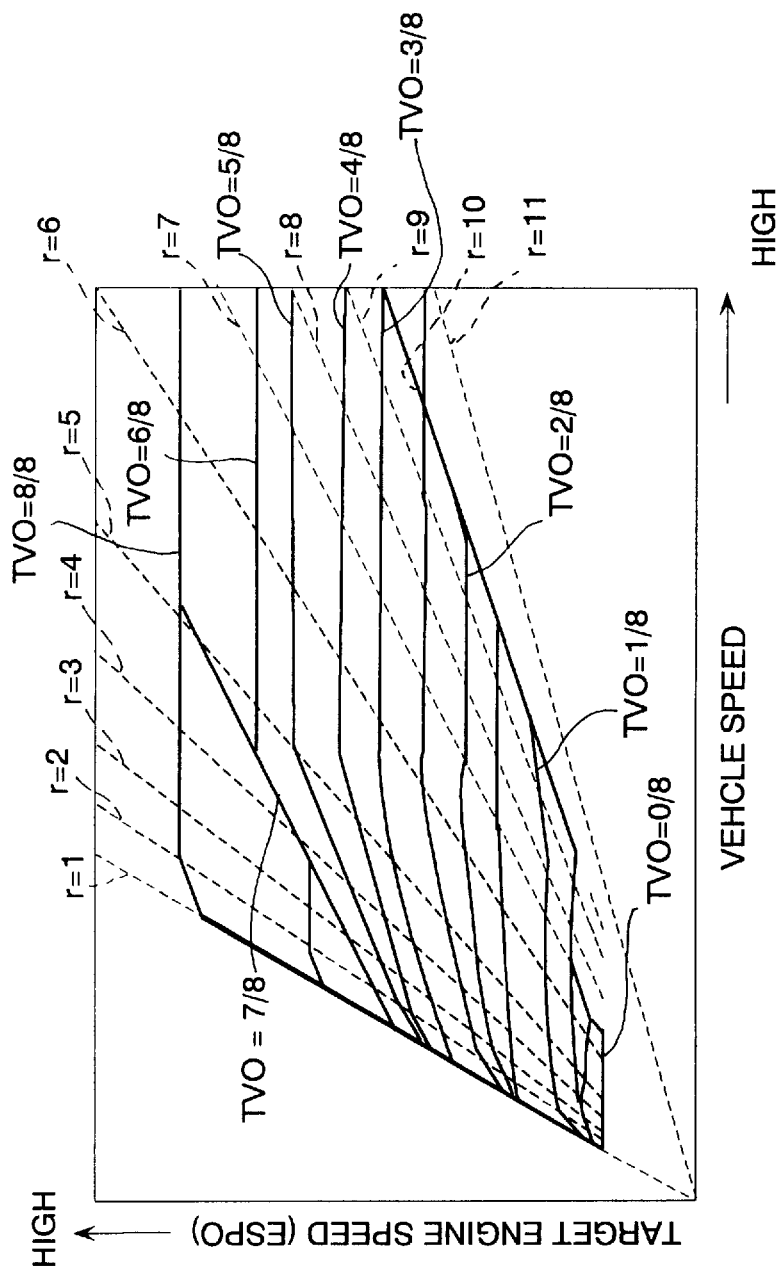
FIG. 6 is a diagrammatic illustration showing an automatic gear shift control map.
Figure 7:
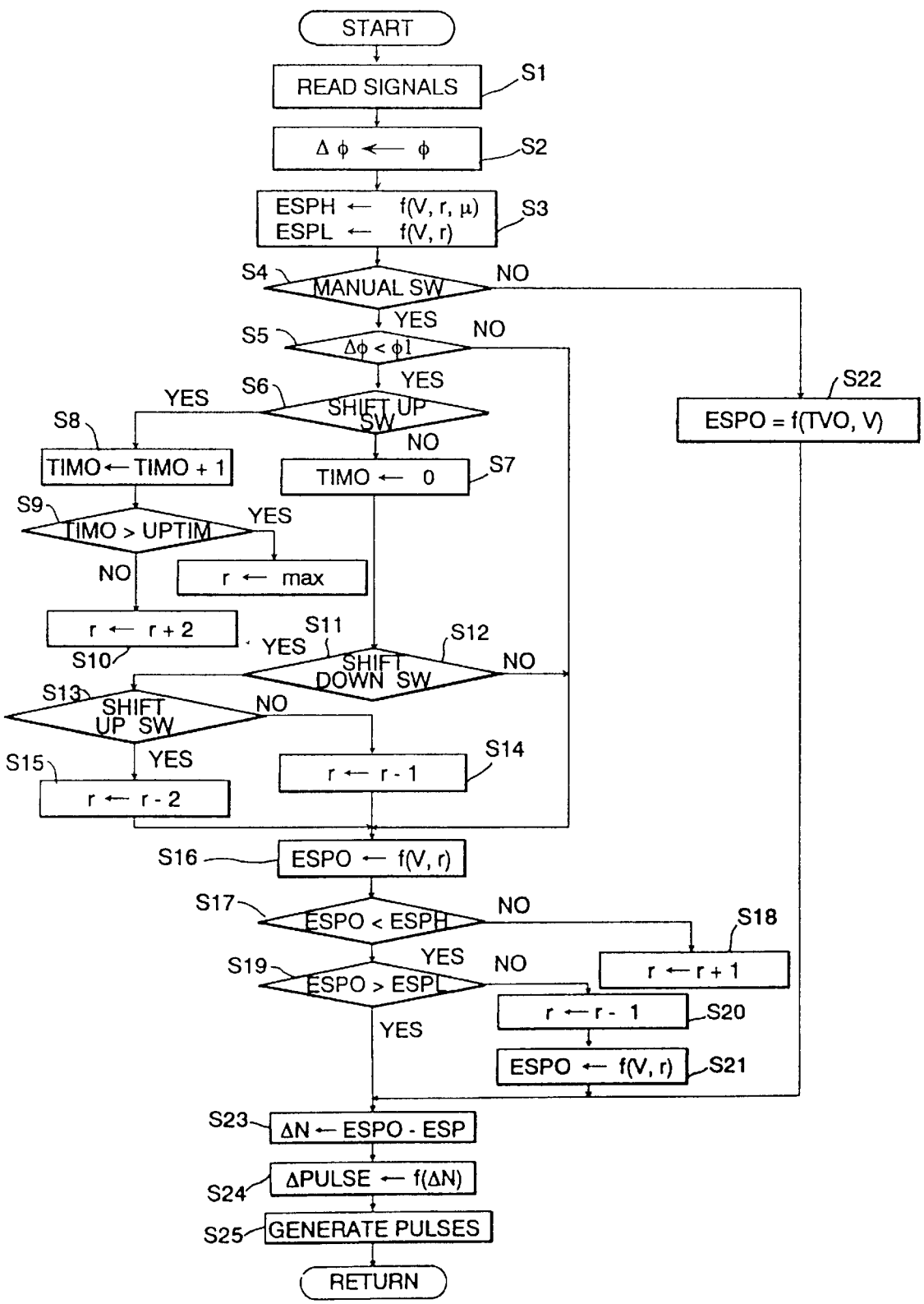
FIG. 7 is a flowchart illustrating the gear ratio control sequence routine.

FIG. 7 shows a flowchart illustrating the manual gear shift control sequence routine. The flowchart logic commences and control passes directly to a function block at step S1 where the control unit 100 reads in various signals from the sensors and switches 101 through 113. At step S2, a calculation is made to find a steering speed Δ$\phi$ based on the steer angle $\phi$ of the steering wheel 50. At step S3, an upper engine speed limit ESPH and a lower engine speed limit ESPL are established. Specifically, the upper engine speed limit ESPH is found from speed characteristics determined based on driving factors, such as vehicle speeds (V), gear (r) and road surface friction coefficients ($\mu$), and the lower engine speed limit ESPL is found from speed characteristics determined based on driving factors, such as vehicle speeds (V) and gear positions (r). Subsequently, a determination is made at step S4 as to whether or not the manual shift mode select switch 110 has been turned ON. When the manual shift mode select switch 110 remains OFF, this indicates that it is regarded that the driver has an intention to make a gear shift in the automatic gear shift mode, then, after having read a target engine speed ESPO on a scheduled gear shift line automatically selected according to the engine throttle opening TVO and vehicle speed V at step S22, the flowchart logic proceeds directly to step S23. As shown in FIG. 6, the automatic gear shift map has scheduled gear shift lines, each of which specify a target engine speed ESPO with respect to vehicle speed V and engine throttle opening TVO.

On the other hand, when the manual shift mode select switch 110 has been turned ON, this indicates that the driver has a demand for making a gear shift in the manual gear shift mode, then, a determination is made at step S5 as to whether or not the steering speed $\Delta\phi$ is lower than a specified speed $\Delta\phi1$. When the steering speed $\Delta\phi$ is equal to or greater than the specified speed $\Delta\phi1$, the flowchart logic proceeds directly to step S16. That is, in the case where the steering wheel 50 is somewhat quickly handled, even if any shift switch 111, 112 is turned ON, the shift command signal is canceled to prohibit a manual gear shift or a manual change in gear ratio, so as to prevent the automatic transmission 12 from changing the gear ratio even if the shift up switch 111 and/or the shift down switch 112 are accidentally operated during handling the steering wheel 50. On the other hand, when the steering speed $\Delta\phi$ is lower than the specified speed $\Delta\phi1$, this indicates that the steering wheel 50 is handled moderately, then, a determination is made at step S6 as to whether or not the shift up switch 111 has been turned ON or turned OFF. When the shift up switch 111 remains OFF, after having reset the timer count TIM0 to 0 (zero) at step S7, the flowchart logic proceeds to step S12. When the shift up switch 111 has been turned ON, after having changed the timer count TIM0 by an increment of 1 (one) at step S8, a determination is made at step S9 as to whether or not the timer count TIM0 has exceeded a specified critical count UPTIM. In this instant, the timer count TIM0 indicates the duration of time for which the shift up switch 111 remains ON. Subsequently, The gear r of the gear of automatic transmission 12 is changed two steps higher at step S10 when the critical count UPTIM has not yet been exceeded, or otherwise changed to the highest available gear ratio (rmax) or the lowest available gear ratio, at a stretch at step S11 when the critical count UPTIM has been exceeded. In this instance, the gear r may be repeatedly changed higher by two steps until the critical time count UPTIM passes over, or otherwise the number of steps changed higher at a stretch may be made larger as the duration of time for which the shift up switch 111 remains ON is prolonged. That is, as specified by chained lines on the automatic gear shift map shown in FIG. 6, the automatic transmission 12 is available at, for example in this embodiment, eleven fixed gear ratios (gears r1 through r11). The manual shift mode select switch 110 is operated to select these fixed gear ratio lines on the gear shift map, and the shift up switch 111 or the shift down switch 112 is turned ON to change a fixed gear ratio line from one to another. Accordingly, at step S10, alternate fixed gear ratio lines are used to change gears higher or lower. For example, when the gear r5 is currently selected, it is replaced with the gear r7 responding to turning the shift up switch 111 ON. However, at step S11, the highest gear r11 is always used when the critical time count UPTIM passes over after the turn ON of the shift up switch 111. Consequently, it is easily and quickly achieved to lower the engine speed ESP during, for example, normally driving.

Thereafter, a determination is made at step S12 as to whether or not the shift down switch 112 has been turned ON or turned OFF. When the shift down switch 112 has been turned ON, a determination concerning the shift up switch 111 is made again at step S13. When the shift up switch 112 remains OFF, the gear r of the automatic transmission 12 is changed one step lower, for example from the fifth gear r5 to the fourth gear 4, at step S14. On the other hand, when the shift down switch 112 has been turned ON, this is regarded that both shift up switch 111 and shift dow switch 112 have been operated to turn ON accidentally at the same time, then, after having changed the gear r two steps lower to return to the previous gear r having been provided before the accidental operation of the shift up and down switches 111 and 112 at step S15. That is, the two step up shift made at step S10 is cancelled at step S15. In the case where it is determined at step S12 that the shift down switch 112 remains OFF, or after having changed the gear r one step lower at step S14, or after having cancelled the two step up shift due to the accidental operation at step S15, the flowchart logic proceeds to step S16 where a target speed ESPO is read on the scheduled gear shift line r selected at step S10, S11 or S14 with respect to the vehicle speed V. Subsequently, a determination is made at step S17 as to whether or not the target engine speed ESPO is lower than the upper engine speed limit ESPH. When the target engine speed ESPO is equal to or higher than the upper engine speed limit ESPH, this is regarded that the engine is operating at an overspeed, then, the gear r is changed one step higher at step S18. On the other hand, when the upper engine speed limit ESPH is not exceeded, another determination os made at step S19 as to whether or not the target engine speed ESPO is higher than the lower engine speed limit ESPL. When the target engine speed ESPO is equal to or lower than the lower engine speed limit ESPL, this is regarded that the engine 1 is operating at a speed possibly too low to avoid an engine stall, then, the gear r is changed one step lower at step S21. After having changed the gear r one step higher at step S10 or one step down at step S20, another target engine speed ESPO is read on the scheduled gear shift line r selected at step S18 or S20 with respect to the vehicle speed V at step S21 in the similar manner at step S16.

In the case where the target engine speed ESPO is between the upper engine speed limit ESPH and the lower engine speed limit ESPL, or after having read the other target engine speed ESPO, the speed difference $\Delta N$ between the engine speed ESP and the target engine speed ESPO is calculated at step S23. Further, the number of driving pulses $\Delta$PULSE with which the stepping motor 47 is driven is calculated based on the speed difference $\Delta N$ at step S24. A drive signal containing the number of driving pulses $\Delta$PULSE is sent to and drives the pulse motor 47 to perform the gear shift feedback control at step S25.

With the automatic transmission control system described above, while the manual shift mode select switch 110 remains OFF, the automatic transmission 12 is kept in the automatic gear shift mode in which the target engine speed ESPO is read on a scheduled gear shift line automatically selected according to the engine speed ESP and the engine throttle opening TVO. On the other hand, while the manual shift mode select switch 110 is turned ON to place the automatic transmission 12 in the manual gear shift mode, when the shift up switch 111 is operated, after having selected the closest gear having a fixed gear ratio to the latest gear previously used in the automatic shift mode, the gear of automatic transmission 12 is automatically changed to a gear higher than the closest gear. On the other hand, when the shift down switch 112 is operated, after having selected the closest gear having a fixed gear ratio to the latest gear previously used in the automatic shift mode, the gear of automatic transmission 12 is automatically changed to a gear lower than the closest gear. However, when both shift up switch 111 and shift down switch 112 are operated at the same time, the automatic transmission 12 is prohibited from making an up shift and a down shift. In this way, the automatic transmission 12 is enabled to be manually shifted according to driver's demands similarly with manual transmissions. Furthermore, an improved gear shift feeling is provided during an up shift and a down shift. That is, because the gear of automatic transmission 12 changes the gear one step lower from the latest gear following the turn-on operation of the shift down switch 112, and consequently the change rate of gear ratio becomes relatively lower during a down shift as compared with during an up shift, the gear ratio or the gear is gradually changed as the shift down switch 112 is repeatedly operated, which achieves fine adjustment of the effect of engine brake. On the other hand, because the gear of automatic transmission 12 is changed two step higher from the latest gear following the turn-on operation of the shift up switch 111 and consequently the change rate of gear ratio becomes relatively higher during an up shift as compared with during a down shift, the gear ratio or the gear is greatly changed stepwise as the shift up switch 111 is repeatedly operated, which makes the driver experience a perceptible decrease in gear ratio through a bodily sensation during an up shift.

Figure 8:
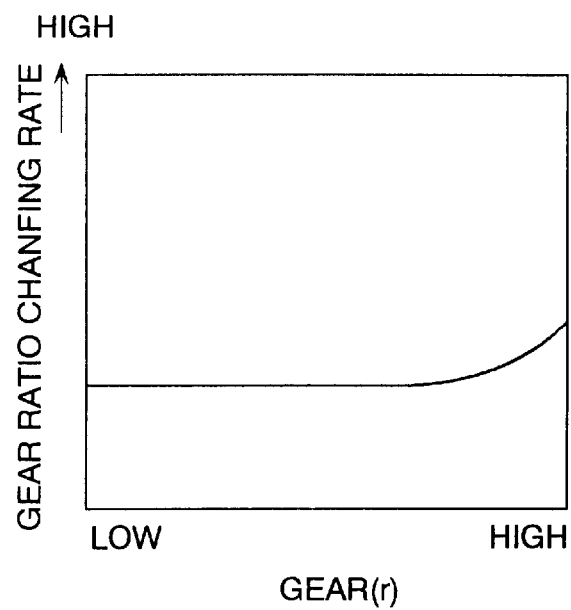
FIG. 8 is a diagrammatic illustration showing a gear ratio change rate control map.

The gear shift control in the manual shift mode may be changed by means of increasing the change rate in gear ratio as the gear becomes higher. Specifically, as shown in FIG. 8, the change rate in gear ratio, specifically the difference between gear ratios of two adjacent gears, is established to be low for low and middle gears and, however, to increase as the gear becomes higher.

Figure 9:
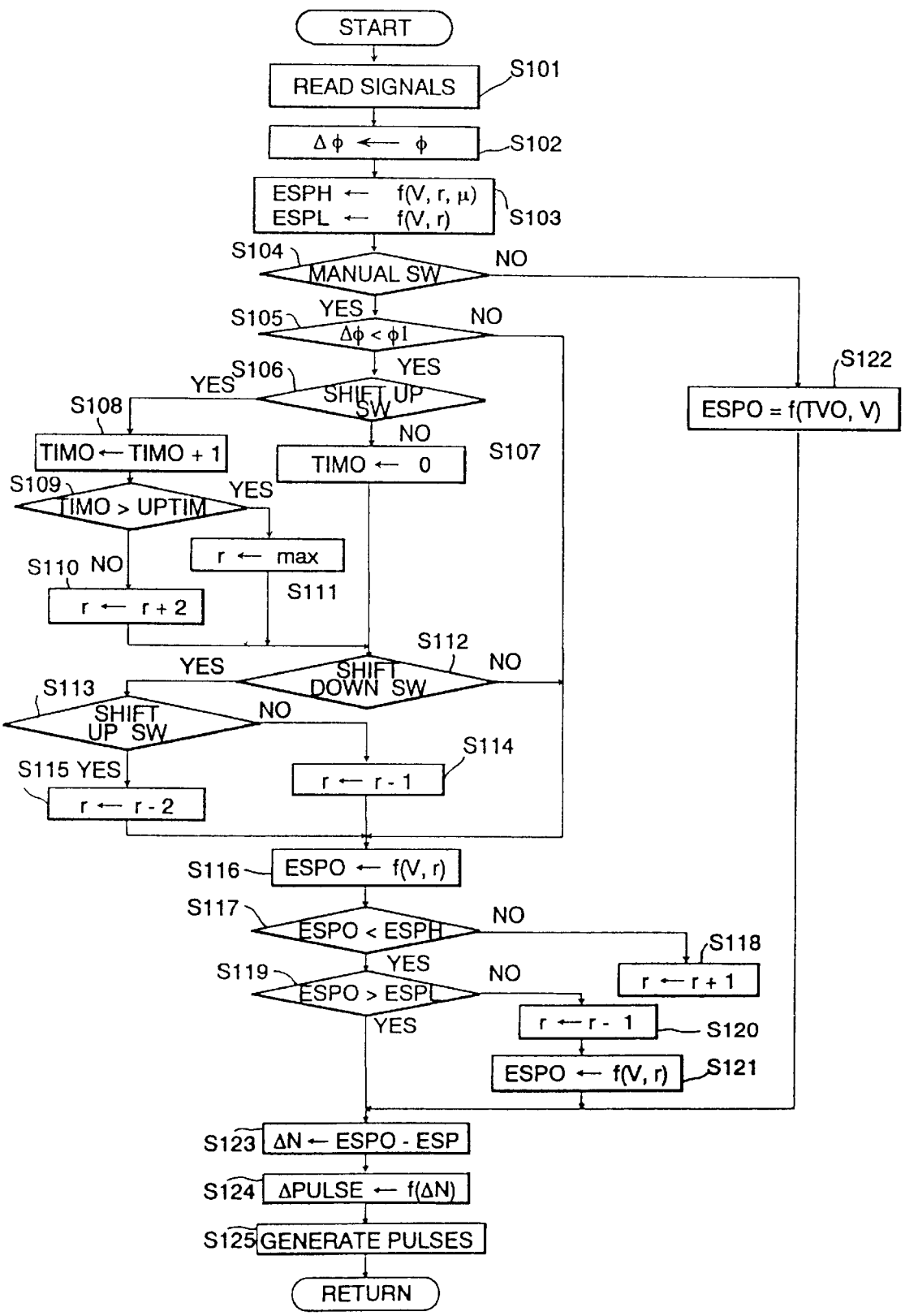
FIG. 9 is a flowchart illustrating a variation of the gear ratio control sequence routine of FIG. 7.

FIG. 9 is a flowchart illustrating a manual gear shift control sequence routine in which the change rate in gear ratio is made low for low and middle gears and increased as the gear becomes higher. This manual gear shift control sequence routine is basically similar to that shown in FIG. 7 excepting steps S10' and S15'. That is, when it is found at step S9 that the timer count TIM0 has exceeded the specified critical count UPTIM, the gear r is changed one step higher at step S10'. Further, when both shift up switch 111 and shift down switch 112 are accidentally turned ON, the one step up shift made at step S10' is cancelled at step S15'. As described above, in stead of using the variable gear ratio change rate, the gear r is changed only one step higher or lower in the manual gear shift mode. The variable gear ratio change rate may of course be employed in the manual gear shift control sequence routine illustrated by the flowchart shown in FIG. 7.

With this automatic transmission control system, even higher gears, in which the effect of engine brake is generally hardly striking during down shifts because of low gear ratios, show an significant effect of engine brake during down shifts, providing a satisfactory feeling of down shift.

The gear shift control in the manual shift mode may further be changed by means of making the change rate in gear ratio lower for down shifts than for up shifts. Specifically, the gear ratio of the automatic transmission 12 is changed in accordance with the duration of time for which the shift up switch 111 or the shift down switch 112 remains ON.

Figure 10:
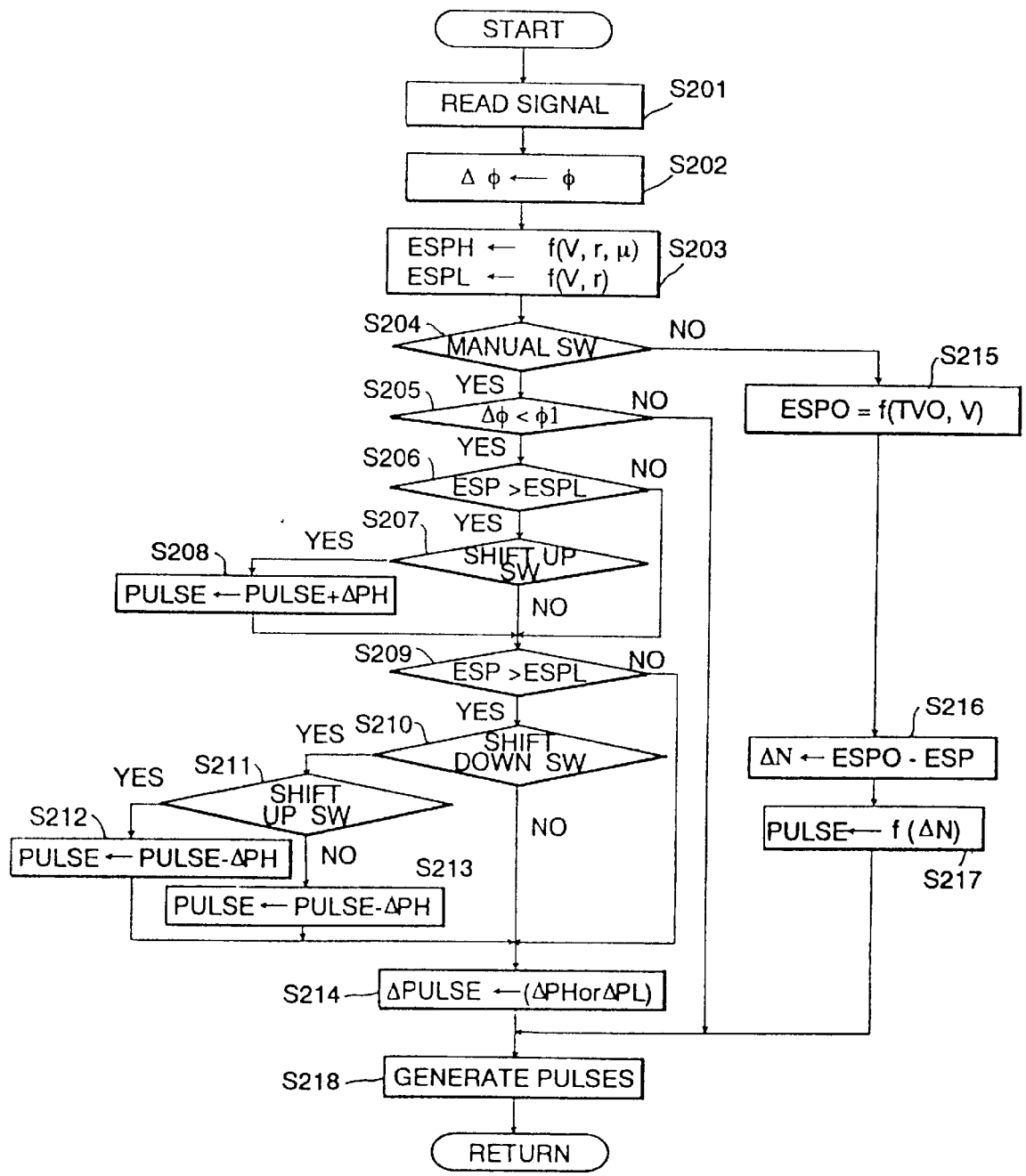
FIG. 10 is a flowchart illustrating another gear ratio control sequence routine.

FIG. 10 is a flowchart illustrating a manual gear shift control sequence routine in which the gear ratio is changed in accordance with the duration of time for which the shift up switch 111 or the shift down switch 112 remains ON. The flowchart logic commences and control passes directly to a function block at step S101 where the control unit 100 reads in various signals from the sensors and switches 101 through 113. At step S102, a calculation is made to find a steering speed $\Delta\phi$ based on the steer angle $\phi$ of the steering wheel 50. At step S103, an upper engine speed limit ESPH and a lower engine speed limit ESPL are established. Specifically, the upper engine speed limit ESPH is found from speed characteristics determined based on driving factors, such as vehicle speeds (V), gear (r) and road surface friction coefficients ($\mu$), and the lower engine speed limit ESPL is found from speed characteristics determined based on driving factors, such as vehicle speeds (V) and gear positions (r). Subsequently, a determination is made at step S104 as to whether or not the manual shift mode select switch 110 has been turned ON. When the manual shift mode select switch 110 has been turned ON, a determination is made at step S105 as to whether or not the steering speed $\Delta\phi$ is lower than a specified speed $\Delta\phi 1$. When the steering speed $\Delta\phi$ is lower than the specified speed $\Delta\phi 1$, another determination is made at step S106 as to whether or not the engine speed ESP is higher than the lower engine speed limit ESPL. When the engine speed ESP is equal to or lower than the lower engine speed limit ESPL, the flowchart logic proceeds directly to step S109. On the other hand, when the lower engine speed limit ESPL is exceeded, a determination is subsequently made at step S107 as to whether or not the shift up switch 111 has been turned ON or turned OFF. When the shift up switch 111 remains OFF, the flowchart logic proceeds directly to step S109. However, when the shift up switch 111 has been turned ON, after having changed the number of driving pulses PULSE by an increment of a specified shift up pulse number $\Delta$PH for shift up at step S108, the flowchart logic proceeds to step S109.

At step S109, a determination is made as to whether or not the engine speed ESP is lower than the higher engine speed limit ESPH. When the engine speed ESP is equal to or higher than the higher engine speed limit ESPH, the flowchart logic proceeds directly to step S114. On the other hand, when the higher engine speed limit ESPH is exceeded, a determination is subsequently made at step S110 as to whether or not the shift down switch 112 has been turned ON or turned OFF. When the shift down switch 111 remains OFF, the flowchart logic proceeds directly to step S114. However, when the shift down switch 112 has been turned ON, another determination is made at step S111 as to whether or not the shift up switch 111 has been turned ON or turned OFF. When the shift up switch 111 remains OFF, the number of driving pulses $\Delta$PULSE is changed by a decrement of a specified shift up pulse number $\Delta$PL, smaller than the specified shift up pulse number $\Delta$PL, at step S113. On the other hand, when the shift up switch 111 remains ON, this is regarded that both shift up switch 111 and shift dow switch 112 have been operated to turn ON accidentally at the same time, then, the number of driving pulses $\Delta$PULSE is changed by a decrement of the specified shift up pulse number $\Delta$PH at step S112. After having changed the number of driving pulses $\Delta$PULSE, the flowchart logic proceeds to step S114 where the number of driving pulses $\Delta$PULSE with which the stepping motor 47 is driven is calculated based on the specified shift up pulse number $\Delta$PH or the specified shift down pulse number $\Delta$PL.

When it is determined that the manual shift mode select switch 110 remains OFF at step S104, N. When the manual shift mode select switch 110 has been turned ON, after having read a target engine speed ESPO on the scheduled gear shift line r according to the vehicle speed V and the engine throttle opening TVO at step S115, the speed difference ΔN between the engine speed ESP and the target engine speed ESPO is calculated at step S116, and the number of driving pulses ΔPULSE with which the stepping motor 47 is driven is calculated based on the speed difference ΔN at step S117.

After the calculation of the number of driving pulses ΔPULSE at step S114 or S117, or when the steering speed Δφ is greater than the specified speed Δφ1 at step S105, a drive signal containing the number of driving pulses ΔPULSE is sent to and drives the pulse motor 47 to perform the gear shift feedback control at step S118.

Figure 11:
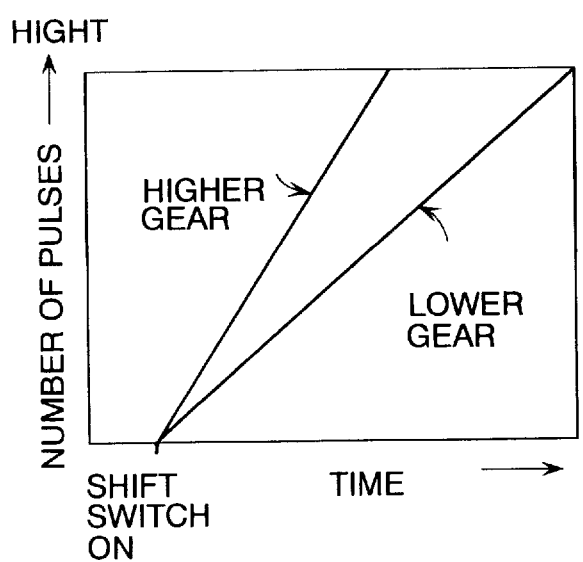
FIG. 11 is a diagrammatic illustration showing a map of characteristics of gear ratio change speed.

With the automatic transmission control system, due to the fact that the number of driving pulses PULSE is continuously changed by an increment of the specified number of pulses ΔPH at step S108 when the automatic transmission 12 is manually shifted up, or continuously changed by a decrement of the specified number of pulses ΔPL at step S113 when the automatic transmission 12 is manually shifted down, the change rate of gear ratio is made lower during down shifts than during up shifts. Specifically, as shown in FIG. 11, the longer the duration of time for which the shift up switch 111 or the shift down switch 112 remains ON is, the greater the number of driving pulses PULSE is proportionally made. Conversely, the shorter the duration of time for which the shift up switch 111 or the shift down switch 112 remains ON is, the smaller the number of driving pulses PULSE is proportionally made. Consequently, while the manual shift mode select switch 110 has been turned ON to place the automatic transmission 12 in the manual shift mode, the number of driving pulses PULSE is continuously changed by an increment of the specified number of pulses ΔPH for the duration of ON state of the shift up switch 111 to change the gear ration toward the lower side (higher gear side), or is continuously changed by a decrement of the specified number of pulses ΔPL for the duration of ON state of the shift down switch 112 to change the gear ration toward the higher side (lower gear side). Because the specified number of pulses ΔPL for down shifts is smaller than the specified number of pulses ΔPH for up shifts, the change rate of gear ratio is made lower during an up shift than during a down shift as shown in FIG. 11. As a result, fine adjustment of the effect of engine brake is achieved during a down shift due to the relative decrease in the gear ratio change rate, preventing the vehicle from encountering unstable driving resulting from an increase in slippage of the drive wheels due to a sharp increase in gear ratio. On the other hand, the relative increase in the gear ratio change rate makes the driver experience a perceptible decrease in gear ratio through a bodily sensation during an up shift.

The automatic transmission control system may be employed in other types of continuously variable automatic transmissions, such as a belt-pulley type of continuously variable automatic transmissions, as well as the toroidal type of continuously variable automatic transmissions.

FIGS. 12 through 17 show an automatic transmission control system in accordance with an embodiment of the invention which is suitable for general gear types of automatic transmissions.

Figure 12:
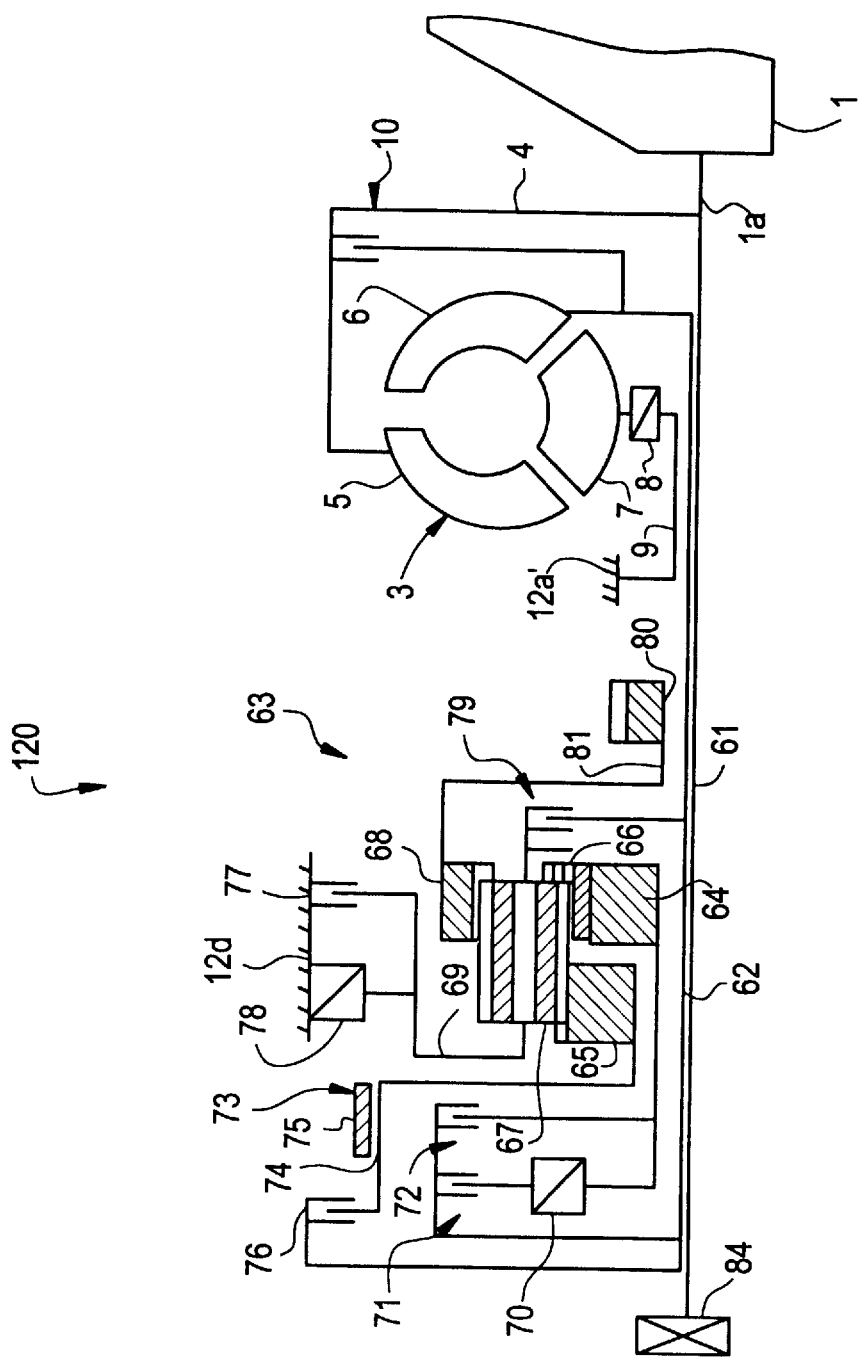
FIG. 12 is a skeleton diagram showing a planetary gear type continuously variable automatic transmission equipped with a transmission control system in accordance with a specific embodiment of the invention.

Referring to FIG. 12 schematically showing a general gear type of automatic transmission 120, the automatic transmission 120 cooperates with a torque converter 3 between an engine 1 and a planetary type transmission gear mechanism 63. This torque converter 3 includes a converter case 4 fastened to an engine output shaft 1a, a pump 5 secured to the converter case 4, a turbine 6, and a stator 7. The stator 7 is attached to a stationary shaft 9 secured to a transmission case 120a through a one-way clutch 8. The torque converter 3 is provided with a lockup clutch 10 which mechanically couples the pump 5 and turbine 6 together when it is activated. The automatic transmission 120 has a center shaft 61 coaxially connected to the engine output shaft 1a. The center shaft 61 at its end has an hydraulic pump 84 secured thereto. A hollow turbine shaft 62, through which the center shaft 61 extends and which is fastened at one end to the turbine 6, mounts thereon a Rabinyo type of planetary gear set 63 well known in the art. The planetary gear set 63 is comprised of a small diameter of sun gear 64 and a large diameter of sun gear 65, which are coaxially arranged side by side, a short pinion gear 66 in mesh with the small sun gear 64, a long pinion gear 67 in mesh with the large sun gear 65, a ring gear 68 in mesh with the short and long pinion gears 66 and 67, and a carrier 69 supporting the short and long pinion gears 66 and 67. In the planetary gear set 63 there are a plurality of friction coupling elements, such as clutches and brakes. Specifically, on axially one side of the planetary gear set 63 remote from the engine 1 there are a forward clutch (FWCL) 71 and a coast clutch (CTCL) 72 arranged coaxially side by side in order from the one end. The forward clutch 71 connects and disconnects transmission of torque to the small sun gear 64 through a first one-way clutch 70 which transmits torque in a direction from the input side to the output side only. The coast clutch 72 connects and disconnects transmission of torque between the turbine shaft 62 and the small sun gear 64. When the coast clutch 72 is activated or locked, transmission of torque is made from the wheels (not shown) to the engine 1, effecting engine brakes. Radially outside the coast clutch 72 there is arranged a band brake type of 2-4 brake (2/4BR) 73 which has a brake drum 74 connected to the large sun gear 65 and a brake band 75 engaged around the brake drum 74. When the 2-4 brake 73 is activated or locked, it locks the large sun gear 65. Behind the 2-4 brake 73 there is arranged a reverse clutch (RVCL) 76 which connects and disconnects transmission of torque between large sun gear 65 and the turbine shaft 62 through the brake drum 74. A low-reverse brake (L/RBR) 77 and a second one-way clutch (OWCL) 78 are arranged coaxially side by side to fix the carrier 69 relative to the transmission case 120a. Further, on axially another side of the planetary gear set 63 close to the engine 1 there is a 3-4 clutch (3/4CL) 79 which connects and disconnects transmission of torque between the turbine shaft 62 and the carrier 69. The automatic transmission 120 has an output gear 80 located on the axially other side of the planetary gear set 63 and connected to the ring gear 68 by means of an transmission output shaft 81. The automatic transmission 120 has five available gears, namely four forward gears and one reverse gear, which are provided by selectively locking and unlocking the frictional coupling elements including the four clutches 71, 72, 76 and 79, and two brakes 73 and 77.

Figure 13:
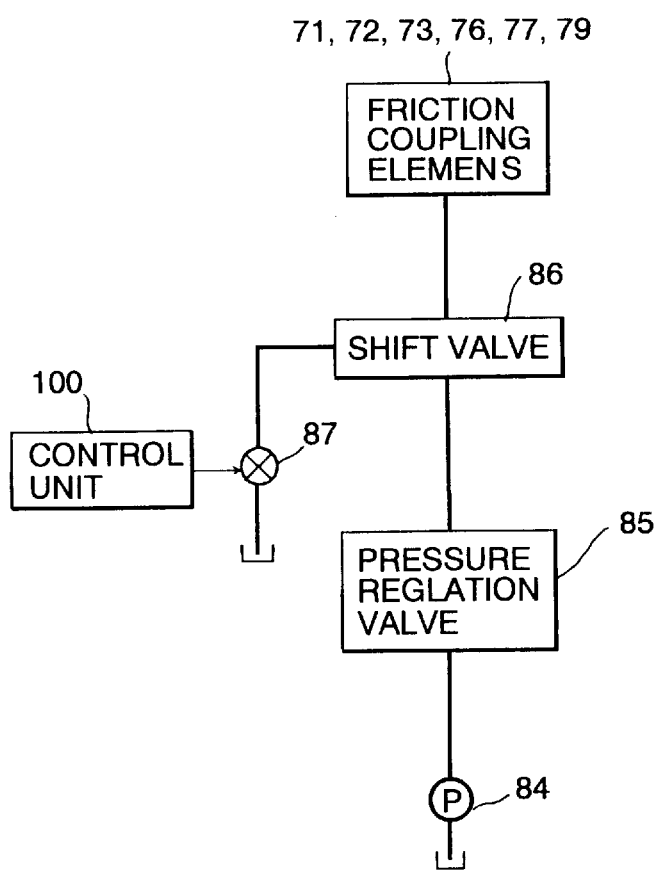
FIG. 13 is a schematic block diagram of a hydraulic control system.

As shown in FIG. 13, these frictional coupling elements 71, 72, 73, 76, 77 and 79 are activated with a pressurized hydraulic fluid supplied from a hydraulic pump 84 of a hydraulic pressure control circuit 83 only schematically shown. This hydraulic pressure control circuit 83 includes control valves such as duty solenoid valves 87 (only one of which is representatively shown for simplicity) for controlling a plurality of shift valves 86 (only one of which is representatively shown for simplicity), respectively. Each duty solenoid valve 87 controls the pressurized working fluid passing therethrough in accordance with duty ratios. A control unit 100 shown in FIG. 14, which is similar to the control unit 100 shown in FIG. 3 excepting controlling the duty solenoid valves 87, controls the duty for each duty solenoid valve 87 in accordance with gears to which the automatic transmission 120 is shifted in a predetermined shift pattern in accordance with gear ranges and driving conditions (vehicle speed and engine load). Each shift valve 86 is operated by means of the duty-controlled operation of the corresponding duty solenoid valve 87 to open or shut off a fluid path leading to the friction coupling element, so as thereby to lock or unlock the friction coupling element. Operation of the friction coupling elements, clutches 71, 72, 76 and 79, and brakes 73 and 77, with respect to each available gear is shown in Table I below.

TABLE I

| Range | GEAR | CLUTCH | | | | BRAKE | | | OWCL | |
|---|---|---|---|---|---|---|---|---|---|---|
| | | FWCL | CTCL | 3/4CL | RVCL | 2/4BR APP. | REL. | L/RBR | 1ST | 2ND |
| P | — | | | | | | | | | |
| R | — | | | | ○ | | | ○ | | |
| N | — | | | | | | | | | |
| D | 1ST | ○ | | | | | ○ | | ○ | ○ |
|   | 2ND | ○ | ○ | | | ○ | | | ○ | |
|   | 3RD | ○ | ○ | ○ | | Δ | ○ | | ○ | |
|   | 4TH | ○ | | ○ | | ○ | | | Δ | |
| 2 | 1ST | ○ | | | | | ○ | | ○ | ○ |
|   | 2ND | ○ | ○ | | | ○ | | | ○ | |
|   | 3RD | ○ | ○ | ○ | | Δ | ○ | | ○ | |
| 4 | 1ST | ○ | | | | | ○ | ○ | ○ | |
|   | 2ND | ○ | ○ | | | ○ | | | ○ | |

In the Table I, the frictional coupling element is locked and participates in torque transmission in the gear labeled circle (○), and the frictional coupling element is locked but does not participate in torque transmission in the gear labeled triangle (Δ).

Figure 14:
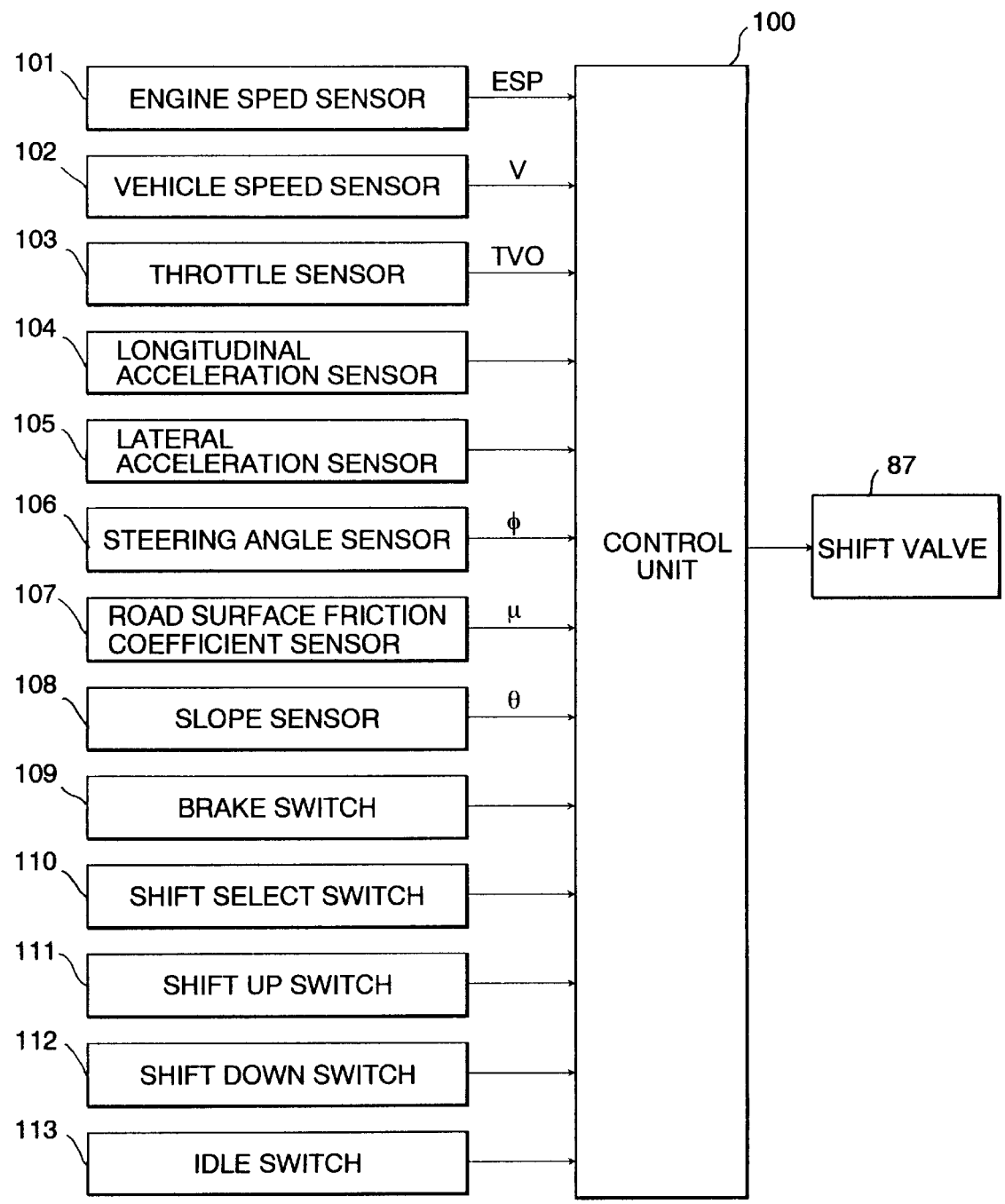
FIG. 14 is a block diagram of the transmission control system for use with the automatic transmission of FIG. 13.

As shown in FIG. 14, the control unit 100 receives various signals from sensors 101 through 108 and switches 109 through 113 based on which it generates control signals for the control of various solenoid valves including a solenoid valve for the lockup clutch 10, as well as the duty control of duty solenoid valves 87.

Figure 15:
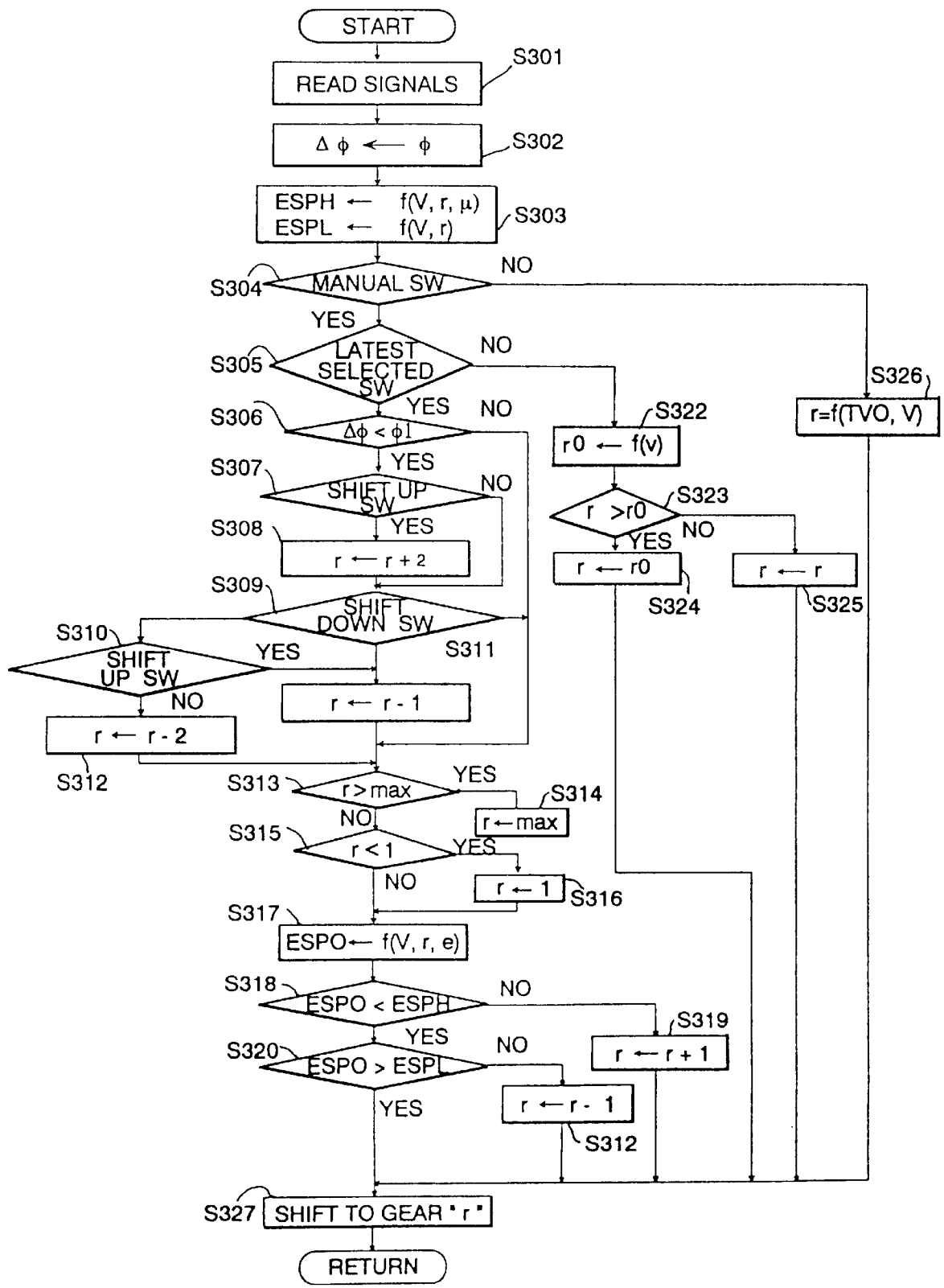
FIG. 15 is a flowchart illustrating a gear ratio control sequence routine for the transmission control system of FIG. 14.
Figure 16:
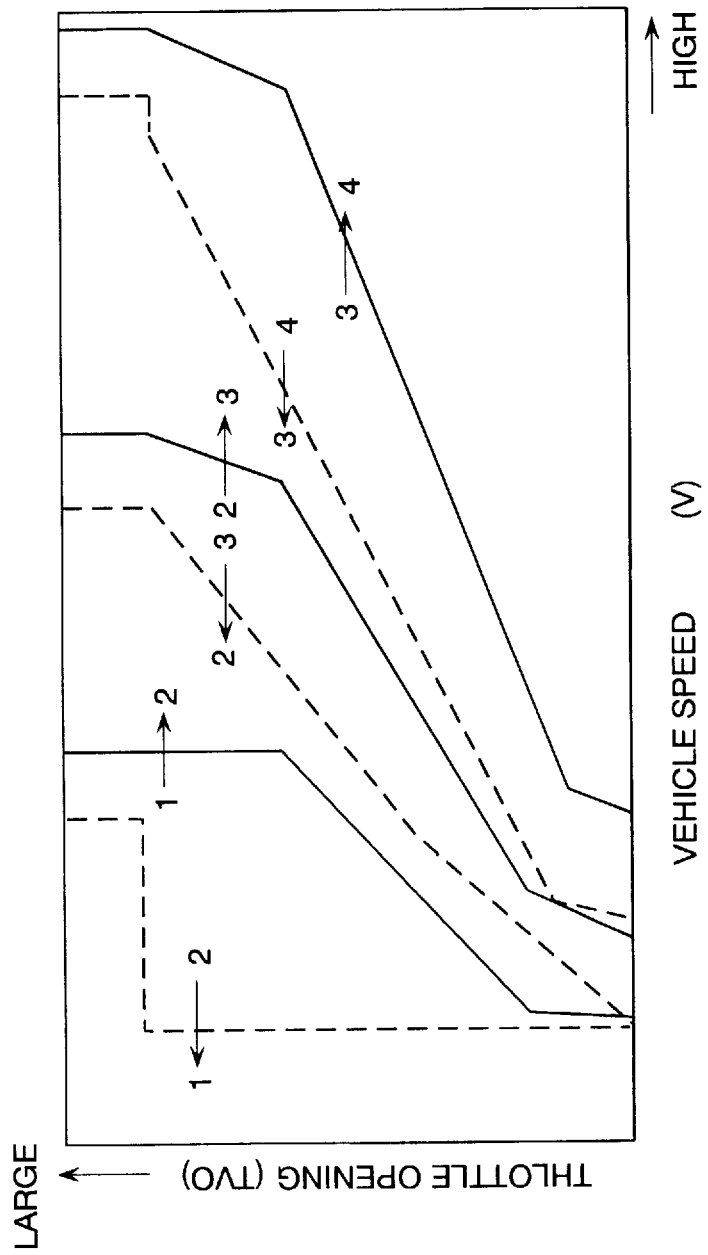
FIG. 16 is a diagrammatic illustration showing an automatic gear ratio control map.
Figure 17:
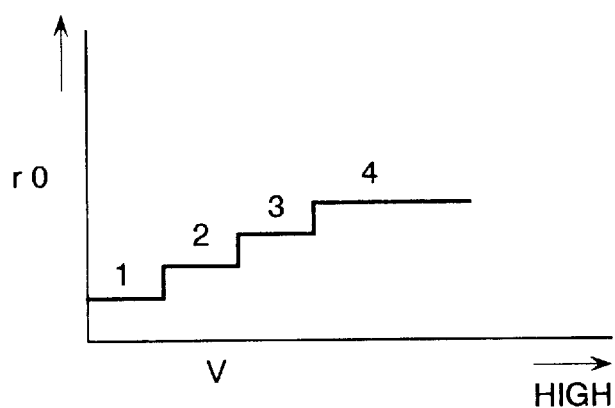
FIG. 17 is a diagrammatic illustration showing an initial gear map.

FIG. 15 is a flowchart illustrating the duty control sequence routine for the duty solenoid valves 87 for selectively locking and unlocking the friction coupling elements. The flowchart logic commences and control passes directly to a function block at step S201 where the control unit 100 reads in various signals from the sensors and switches 101 through 113. At step S202, a calculation is made to find a steering speed Δφ based on the steer angle φ of the steering wheel 50. At step S3, an upper engine speed limit ESPH and a lower engine speed limit ESPL are established. Specifically, the upper engine speed limit ESPH is established based on speed characteristics determined based on driving factors, such as the vehicle speed (V), gear (r) and road surface friction coefficients ($\mu$), and the lower engine speed limit ESPL is established based on speed characteristics determined based on driving factors, such as the vehicle speed (V) and gear (r). Subsequently, a determination is made at step S204 as to whether or not the manual shift mode select switch 110 has been turned ON. When the manual shift mode select switch 110 remains OFF, this indicates that it is regarded that the driver has an intention to make a gear shift in the automatic gear shift mode, then, a target gear r is read according to the engine throttle opening TVO and vehicle speed V on a scheduled gear shift map at step S226. Scheduled gear shift lines have been established with respect to vehicle speed V and engine load (engine throttle opening TVO) in a gear shift map as shown in FIG. 16. After having read the target gear r at step S226, the flowchart logic proceeds directly to step S227.

On the other hand, when the manual shift mode select switch 110 has been turned ON, this indicates that the driver has a demand for making a gear shift in the manual gear shift mode, then, a determination is made at step S205 as to whether or not the manual shift mode select switch 110 was turned ON in the last duty control cycle. When the manual shift mode select switch 110 was not turned ON in the last duty control cycle, the flowchart proceeds to steps S222 through S225. After having read an initial gear r0 is read in accordance with the vehicle speed on an initial gear map shown in FIG. 17 at step S222, a determination is made at step S223 as to whether or not the gear in which the automatic transmission 120 is presently put is higher than the initial gear r0. If the present gear is higher than the initial gear, the initial gear r0 is substituted for the target gear r at step S224. On the other hand, if the present gear is the same as or lower than the initial gear, the present gear r is substituted for the target gear r at step S225. After having fixed the target gear r at step S224 or at step S225, the flowchart logic proceeds directly to step S227.

On the other hand, when the manual shift mode select switch 110 was turned ON in the last duty control cycle, because the an initial gear r0 has been substituted for the target gear r, then the flowchart logic proceeds to steps S206 through S221. At step S206, a determination is made as to whether or not the steering speed Δφ is greater than a specified speed Δφ1. When the steering wheel 50 is handled at a speed equal to or higher than the specified speed Δφ1, the flowchart logic proceeds directly to step S213. However, when the steering wheel 50 is handled at a speed lower than the specified speed Δφ1, another determination is made at step S207 as to whether or not the shift up switch 111 has been turned ON. When the shift up switch 111 has been turned ON with the driver's demand for an up shift, after the target gear r has been changed to a gear two steps higher at step S208, a determination is made at step S209 as to whether or not the shift down switch 112 has been turned ON. However, when the shift up switch 111 remains OFF, the change of target gear r at step S208 is skipped.

Subsequently, a determination is made at step S209 as to whether or not the shift down switch 112 has been turned ON. When the shift down switch 112 has been turned ON with a driver's demand for a down shift, a determination concerning the shift up switch 111 is made again at step S210. When the shift up switch 112 remains OFF, the target gear r is changed one step lower, for example from the third gear to the second gear, at step S211. On the other hand, when the shift up switch 111 has been turned ON, this is regarded that both shift up switch 111 and shift dow switch 112 have been operated to turn ON accidentally at the same time, then, the target gear r is changed two steps lower at step S212. In the case where it is determined at step S209 that the shift down switch 112 remains OFF, or after having changed the target gear r one step lower at step S211, or after having cancelled the change of target gear r to a two step higher gear at step S212, the flowchart logic proceeds to step S213.

At step S213, a determination is made as to whether or not the target gear r is higher than an upper limit gear rmax, for example the fourth (4th) gear. Subsequently, after having substituted the upper limit gear rmax for the target gear r at step S214 when the upper limit gear rmax is exceeded, or without changing the target gear r when the upper limit gear rmax is not exceeded, a determination is made at step S215 as to whether or not the target gear r is lower than the lowest gear, namely the first (1st) gear. After having substituted the first (1st) gear for the target gear r at step S216 when the lowest gear is exceeded, or without changing the target gear r when the lowest gear rmax is not exceeded, a target engine speed ESPO is calculated based on the eventual target gear r, the vehicle speed V and a converter speed ratio e (which is defined as a ratio of the turbine speed which is represented by the vehicle speed relative to the pump speed which is represented by the engine speed) at step S217. Subsequently, a determination is made at step S218 as to whether or not the target engine speed ESPO is lower than the upper engine speed limit ESPH. When the target engine speed ESPO is equal to or higher than the upper engine speed limit ESPH, this is regarded that the engine 1 is operating at an overspeed, then, the target gear r is changed one step higher at step S219. On the other hand, when the upper engine speed limit ESPH is not exceeded, another determination is made at step S220 as to whether or not the target engine speed ESPO is higher than the lower engine speed limit ESPL. When the target engine speed ESPO is equal to or lower than the upper engine speed limit ESPH, this is regarded that the engine 1 is operating at a speed possibly too low to avoid an engine stall, then, the target gear r is changed one step lower at step S221. After having changed the target gear r one step higher at step S219 or one step lower at step S221, or the target speed ESPO is between the upper and lower engine speed limits ESPH and ESPL, the flowchart logic proceeds to step S227.

Finally, at step S227, the duty ratio necessary for the duty solenoid valve 87 to provide the target gear r is calculated, and a drive signal representative the duty ratio is sent to the duty solenoid valve 87.

With the automatic transmission control system, while the manual shift mode select switch 110 remains OFF, the automatic transmission 120 is held in the automatic shift mode. However, the manual shift mode select switch 110 is turned ON once, the automatic transmission 120 is operated to meet the driver's demand for up shifts and down shifts. The gear of automatic transmission 120 is set to an initial gear r0 in response to the change to the manual shift mode, and subsequently changed to a higher gear when the shift up switch 111 is turned ON or to a lower gear when the shift down switch 112 is turned ON. In this instance, because the gear of automatic transmission 120 is changed one step lower from the latest gear following the turn-on operation of the shift down switch 112 and consequently the change rate of gear ratio becomes relatively lower during a down shift as compared with during an up shift, the gear is gradually changed as the shift down switch 112 is repeatedly operated, achieving fine adjustment of the effect of engine brake. On the other hand, because the gear of automatic transmission 12 is changed two step higher from the latest gear following the turn-on operation of the shift up switch 111 and consequently the change rate of gear ratio becomes relatively higher during an up shift as compared with during a down shift, the gear is greatly changed stepwise as the shift up switch 11 1 is repeatedly operated, making the driver experience a perceptible decrease in gear ratio through a bodily sensation during an up-shift.

While the embodiment of automatic transmission control system described in connection with FIGS. 12 through 17 is employed in an automatic transmission having four forward gears, it may be incorporated in automatic transmissions having more than four forward gears. The manual gear shift can be made more exactly as the number of available gears becomes larger.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for controlling a gear ratio of an automotive automatic transmission changeable between an automatic shift mode and a manual shift mode, said automatic transmission control system comprising:

gear ratio control means for controlling a change of the gear ratio to shift the automatic transmission to a desired gear;

manually operated shift up means for causing said gear ratio control means to make the gear ratio lower to shift the automatic transmission up in said manual shift mode when said shift up means is continuously operated;

manually operated shift down means for causing said gear ratio control means to change the gear ratio higher to shift the automatic transmission down in said manual shift mode when said shift down means is continuously operated; and a control means for controlling said gear ratio control means to make a change rate of the gear ratio lower when said shift down means is continuously operated than when said shift up means is continuously operated.

2. An automatic transmission control system as defined in claim 1, wherein said control means detects a duration of continuous operation of each of said shift up means and said shift down means, and controls said gear ratio control means to make said change rate higher when said duration of continuous operation is longer than a specified time than when said duration of continuous operation is shorter than said specified time.

3. An automatic transmission control system as defined in claim 2, wherein said control means controls said gear ratio control means to change said change rate so as to change the gear ratio to a gear ratio for a highest available gear at once when said duration of continuous operation of said shift up means is longer than said specified time.

4. An automatic transmission control system as defined in claim 1, wherein said control system controls said gear ratio control means to make said change rate higher when a gear prior to changing said change rate is higher than when said gear is lower.

5. An automatic transmission control system as defined in claim 1, wherein said control means keeps said gear ratio control means from changing said change rate when said shift up means and said shift down means are coincidentally operated.

6. An automatic transmission control system as defined in claim 1, wherein said automatic transmission is of a continuously variable type.

7. A control system for controlling a gear ratio of an automotive automatic transmission changeable between an automatic shift mode and a manual shift mode, said automatic transmission control system comprising:

gear ratio control means for controlling a change of the gear ratio in accordance with magnitude of an electric signal to shift the automatic transmission to a desired gear;

manually operated shift up means for making the gear ratio lower to shift the automatic transmission up in said shift mode when said shift up means is continuously operated;

manually operated shift down means for making the gear ratio higher to shift the automatic transmission down in said shift mode when said shift down means is continuously operated; and control means for controlling said electric signal magnitude so that said gear ratio change means changes the gear ratio at a change speed lower when said shift down means is operated than when said shift up means is operated.

8. An automatic transmission control system as defined in claim 7, wherein said control means detects a duration of continuous operation of each of said shift up means and said shift down means, and makes said electric signal magnitude greater as said duration of continuous operation becomes longer.

9. An automatic transmission control system as defined in claim 7, wherein said control means detects a duration of continuous operation of each of said shift up means and said shift down means, and makes said electric signal magnitude smaller as said duration of continuous operation becomes shorter.

* * * * *